United States Patent
Cheng

(10) Patent No.: US 8,032,163 B2
(45) Date of Patent: Oct. 4, 2011

(54) SYSTEM AND METHOD FOR PERFORMING QUICK SHORT MESSAGE FUNCTIONS FOR A MOBILE PHONE

(75) Inventor: Kai-Yang Cheng, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 481 days.

(21) Appl. No.: 12/239,826

(22) Filed: Sep. 29, 2008

(65) Prior Publication Data
US 2009/0143084 A1    Jun. 4, 2009

(30) Foreign Application Priority Data
Nov. 29, 2007 (CN) .......................... 2007 1 0202786

(51) Int. Cl.
*H04W 4/00* (2009.01)
(52) U.S. Cl. .............. 455/466; 455/185.1; 455/412.1
(58) Field of Classification Search .............. 455/466
See application file for complete search history.

(56) References Cited

U.S. PATENT DOCUMENTS

| | | | | |
|---|---|---|---|---|
| 5,687,216 A | * | 11/1997 | Svensson ............... | 455/412.2 |
| 7,289,818 B2 | * | 10/2007 | Yoon et al. ............. | 455/466 |
| 2003/0147382 A1 | * | 8/2003 | Neuman ............... | 370/352 |
| 2005/0048958 A1 | * | 3/2005 | Mousseau et al. ...... | 455/415 |
| 2006/0146840 A1 | * | 7/2006 | Smith et al. ............ | 370/401 |

FOREIGN PATENT DOCUMENTS

| | | |
|---|---|---|
| CN | 1624658 | 6/2005 |
| CN | 1856138 | 11/2006 |

* cited by examiner

*Primary Examiner* — Kamran Afshar
*Assistant Examiner* — Edward Zhang
(74) *Attorney, Agent, or Firm* — Altis Law Group, Inc.

(57) ABSTRACT

A method for performing quick short message functions for a mobile phone is disclosed. The method includes reading short messages from a subscriber identify module card and a memory system of the mobile phone, copying the short messages into a short message status table, if the mobile phone has been started up for the first time, and saving the short message status table into the memory system. The method further includes obtaining the short message status table stored in the memory system if the mobile phone is powered on hereafter, and monitoring the mobile phone to determine if status of the short messages has been changed. The method further includes updating the short message status table and saving the updated short message status table into the memory system, if status of the short messages has been changed.

15 Claims, 4 Drawing Sheets

Short message status table

| Index | Status | Content | ... |
|---|---|---|---|
| 1 | read | Hello | ... |
| 2 | unread | How are you | ... |
| 3 | blank | | ... |
| 4 | unsent | Bread | ... |
| 5 | sent | Milk | ... |
| ... | ... | ... | ... |

FIG. 3

SYSTEM AND METHOD FOR PERFORMING QUICK SHORT MESSAGE FUNCTIONS FOR A MOBILE PHONE

BACKGROUND

1. Field of the Invention

Embodiments of the present disclosure relate to short message functions for mobile phones, and more particularly to a system and method for performing quick short message functions for a mobile phone.

2. Description of Related Art

Short Message Service (SMS) is a communication protocol allowing the interchange of short messages between mobile telephone devices. The term "SMS" is used as a synonym for a short message or the act of sending a short message.

FIG. 1 is a block diagram of a known system for using a short message function for a mobile phone. In the illustrated embodiment, short messages may be read one by one from a subscriber identify module (SIM) card and a memory system of the mobile phone, so as to establish a short message status table. The short message function can be used only after the short message status table is established. The short message status table, which saves short messages temporarily, is a list in a cache of the mobile phone.

The short message status table is removed entirely when the mobile phone is turned off. The short message status table needs to be regenerated so as to perform quick short message function when the mobile phone is started again. As a result, it always takes up a long time to read short messages from the SIM card, and convenience and efficiency are undoubtedly affected.

What is needed, therefore, is an improved system and method for performing quick short message functions for a mobile phone.

SUMMARY

In one aspect, a computer-implemented method for performing quick short message functions for a mobile phone is provided. The method includes: (a) reading short messages from a SIM card of the mobile phone and copying the short messages read from the SIM card into a short message status table, if the mobile phone has been started up for the first time; (b) reading short messages from a memory system, and copying the short messages read from the memory system into the short message status table; (c) saving the short message status table into the memory system; (d) obtaining the short message status table stored in the memory system if the mobile phone is powered on; (e) monitoring the mobile phone to determine if status of the short messages has been changed; (f) updating the short message status table, and saving the updated short message status table into the memory system, if status of the short messages has been changed.

Other advantages and novel features will become more apparent from the following detailed description certain embodiments of the present disclosure when taken in conjunction with the accompanying drawings.

BRIEF DESCRIPTION OF THE DRAWINGS

FIG. 3 is a block diagram of one embodiment of a short message status table.

DETAILED DESCRIPTION OF CERTAIN INVENTIVE EMBODIMENTS

All of the processes described below may be embodied in, and fully automated via, software code modules executed by one or more general purpose processors of a mobile phone. Some or all of the methods may alternatively be embodied in specialized hardware.

Figure 1:
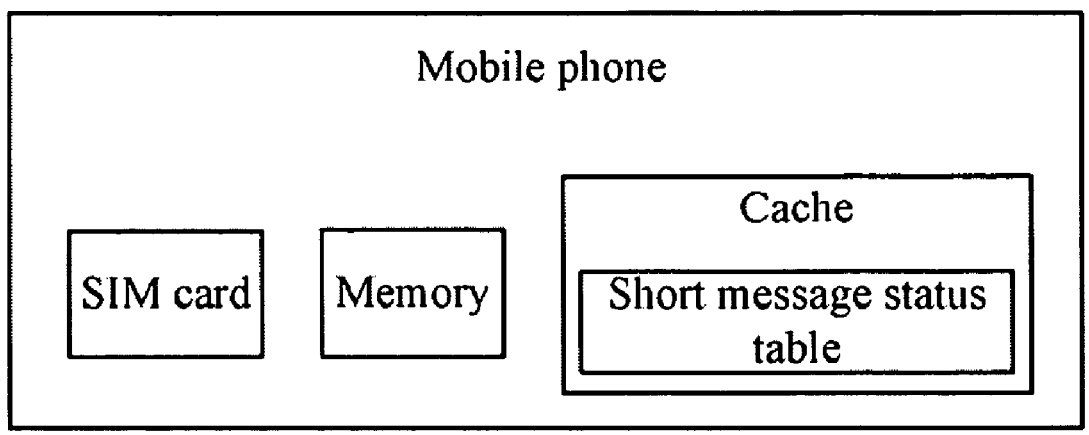
FIG. 1 is a block diagram of one embodiment of a known system for using a short message function for a mobile phone.
Figure 2:
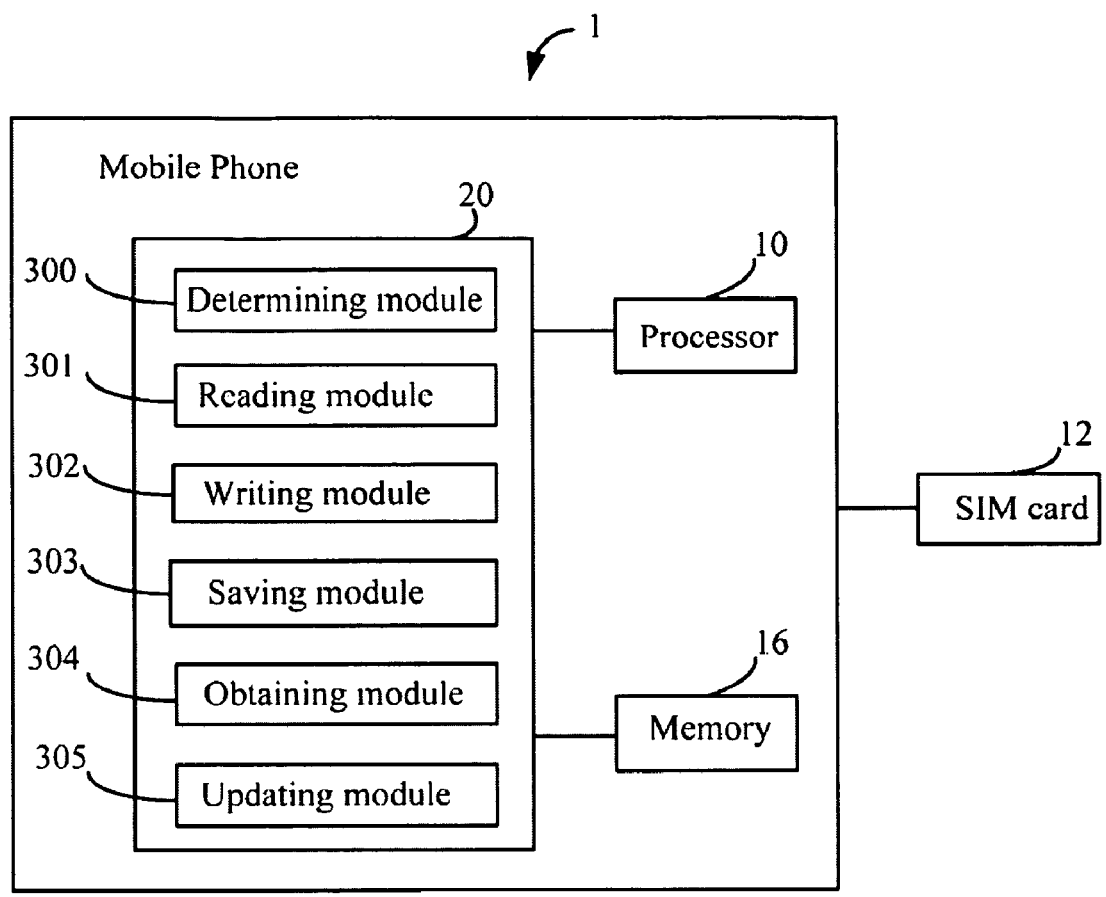
FIG. 2 is a block diagram of one embodiment of a system for performing quick short message functions for a mobile phone.

FIG. 2 is a block diagram of one embodiment of a system 20 for performing quick short message functions for a mobile phone.

In one embodiment, the system 20 may be applied in an electronic device, such as mobile phone 1, for example. The mobile phone 1 may include a processor 10, a SIM card 12 and a memory system 16. The memory system 16 may be an internal memory system card or an external memory system card. The external memory system card may include a smart media card (SMC), a secure digital card (SDC), a compact flash card (CFC), a multi media card (MMC), a memory system stick (MS), an extreme digital card (XDC), and a trans flash card (TFC) depending on the embodiment.

The system 20 may be a software program including a plurality of instructions and/or specialized hardware, and is executed by the processor 10 of the mobile phone 1. The modules may be used to perform certain functions and will be described in detail below. In one embodiment, the system 20 may comprise a determining module 300, a reading module 301, a writing module 302, a saving module 303, an obtaining module 304, and an updating module 305. A processor 10 may be used to execute one or more operations of the modules 300, 301, 302, 303, 304, 305.

The determining module 300 is configured for detecting if the mobile phone 1 has been started up for the first time.

The reading module 301 is configured for reading short messages from the SIM card 12 according to the index values of the short messages in the SIM card 12, if the mobile phone 1 has been started up for the first time. In other words, the reading module 301 reads all the short messages from the SIM card 12. A unique index value is assigned to a short message, regardless if the short message has been saved to memory system or SIM, and can be used for querying short messages quickly.

The writing module 302 is configured for copying the short messages read from the SIM card 12 into a short message status table. The short message status table (referring to FIG. 3) is configured for saving the short messages.

The reading module 301 is further configured for reading short messages from the memory system 16, according to the index values of the short messages. In other word, the reading module 301 reads all the short messages from the memory system 16.

The writing module 302 is further configured for copying the short messages read from the memory system 16 into the short message status table.

The saving module 303 is configured for saving the short message status table into the memory system 16. In one embodiment, the short message status table is not deleted when the mobile phone is powered off.

The obtaining module 304 is configured for obtaining the short message status table directly from the memory system 16. The short message status table (referring to FIG. 3)

includes, for example, an index column, a status column and a content column. The index column is configured for storing index values of the short messages. The status column is configured for storing current statuses of the short messages. The current statuses of the short messages include, but are not limited to, blank, read, unread, sent, and unsent. The content column is configured for storing contents of the short messages, for example, "Hello," "How are you," etc.

The determining module 300 is further configured for monitoring the mobile phone 1 so as to determine if the status of short messages in the short message status table has been changed. In one embodiment, for example, once the short message with an unread status has been read, the status of the short message is changed to "read".

The updating module 305 is configured for updating the short message status table if the status of the short messages has been changed. In one particular embodiment, if the mobile phone 1 receives a new short message, the updating module 305 queries the short message status table according to the index values of the short messages, so as to obtain a record of which status is "blank" in the short message status table (referring to FIG. 3). A record includes an index value of the short message, the status of the short message and the content of the short message. For example, if the index value is "1", the status is "read" and the content is "Hello". A record includes "1," "read," and "Hello,". The updating module 305 changes the status of the short message from "blank" to "unread" in the status column, and saves the content of the short message into the content column. In another particular embodiment, if the mobile phone 1 reads a short message of which status is "unread," the updating module 305 changes the status of the short message from "unread," to "read,". In another particular embodiment, if a short message needs to be saved in the mobile phone 1 in advanced, the updating module 305 queries the short message status table according to the index values of the short messages, so as to obtain a record of which status is "blank." The updating module 305 changes the status from "blank" to "unsent," and saves the short message into the content column. In one particular embodiment, if the mobile phone 1 sends a short message of which status is "unsent," the updating module 305 changes the status from "unsent" to "sent."

The saving module 303 is configured for saving the updated short message status table into the memory system 16.

Figure 4:
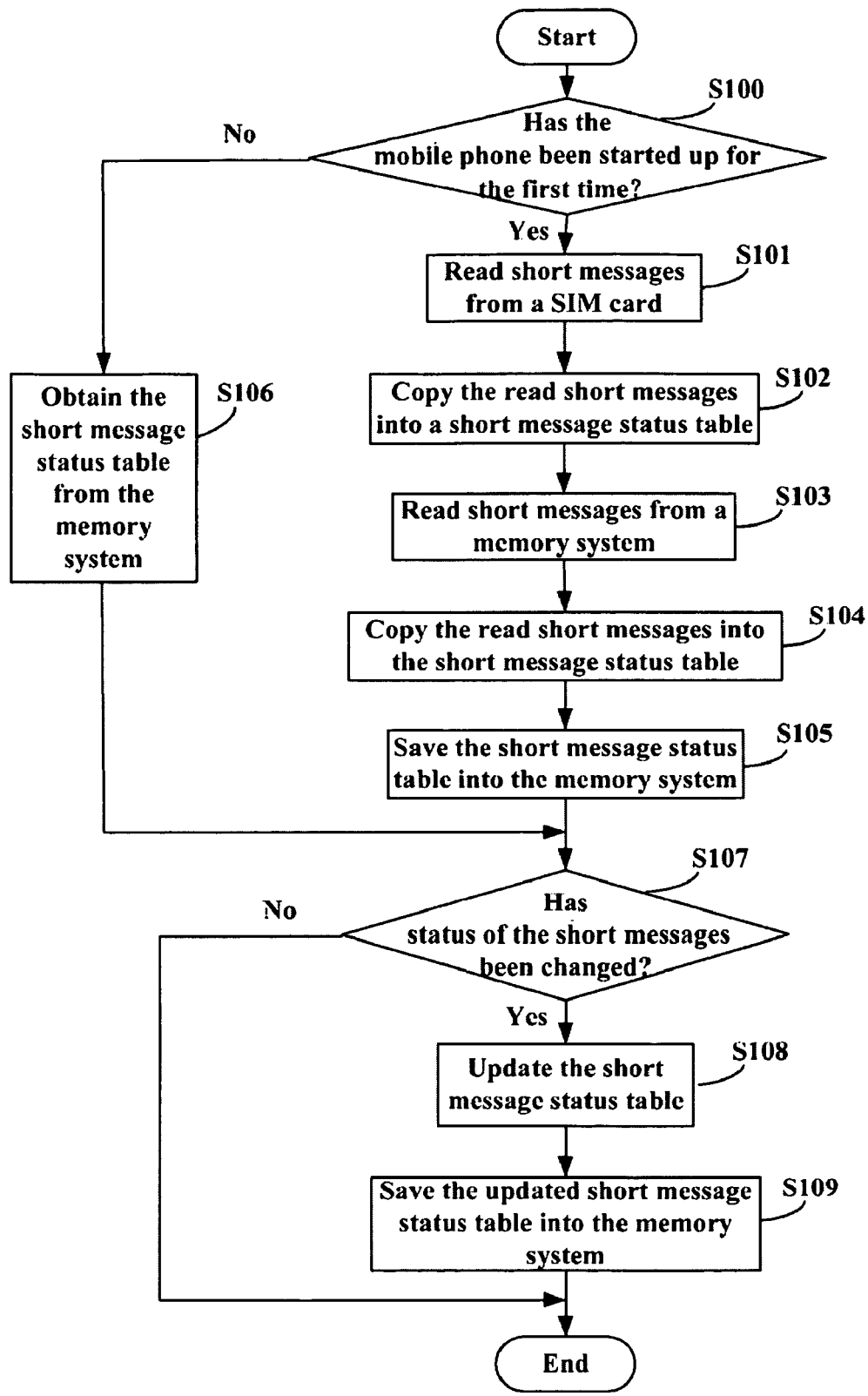
FIG. 4 is a flowchart of one embodiment of a method for performing quick short message functions for a mobile phone by utilizing the system of FIG. 2.

FIG. 4 is a flowchart of one embodiment of a method for performing quick short message functions for a mobile phone by utilizing the system of FIG. 2. Depending on the embodiment, additional blocks may be added, others removed, and the ordering of the blocks may be changed.

In block S100, the determining module 300 detects if the mobile phone 1 has been started up for the first time.

If the mobile phone 1 has been started up for the first time, then in block S101, the reading module 301 reads short messages from the SIM card 12 according to index values of the short messages in the SIM card 12. In other words, the reading module 301 reads all the short messages from the SIM card 12.

In block S102, the writing module 302 copies the short messages read from the SIM card 12 into a short message status table. The short message status table is a list and configured for saving short messages.

In block S103, the reading module 301 reads short messages from the memory system 16, according to the index values of the short messages. In other word, the reading module 301 reads all the short messages from the memory system 16.

In block S104, the writing module 302 copies the short messages read from the memory system 16 into the short message status table.

In block S105, the saving module 303 saves the short message status table into the memory system 16. In one embodiment, the short message status table is not removed when the mobile phone is powered off.

If the mobile phone 1 has not been started up for the first time in block S101, then procedure may turn to block S106. The obtaining module 304 obtains the short message status table directly from the memory system 16.

In block S107, the determining module 300 monitors the mobile phone 1 so as to determine if the status of short messages in the short message status table has been changed. In one embodiment, for example, a short message is unread, if a user read the short message, the status of the short message will be changed to "read". If the statuses of the short messages do not change, the procedure ends.

Otherwise, if any status of the short messages changes, in block S108, the updating module 305 updates the short message status table if the status of the short messages has been changed. In one particular embodiment, if the mobile phone 1 receives a new short message, the updating module 305 queries the short message status table according to the index values of the short messages, so as to obtain a record of which status is "blank". The updating module 305 changes the status from "blank" to "unread" in the status column, and saves the content of the short message into the content column.

In block S109, the saving module 303 saves the updated short message status table into the memory system 16.

It may be understood that, instructions for performing the aforementioned methods may be included in a non-transitory storage medium such as the memory system 16, and are executed by the processor 10 of the mobile phone 1.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing system for performing quick short message functions for a mobile phone, the mobile phone comprising a memory system and a subscriber identify module (SIM) card, the computing system comprising:
    a determining module configured for detecting if the mobile phone has been started up for a first time;
    a reading module configured for reading short messages from the SIM card and the memory system, if the mobile phone has been started up for the first time;
    a writing module configured for copying the short messages into a short message status table, the short message status table comprising a content column short that stores content of the short messages;
    a saving module configured for saving the short message status table into the memory system;
    an obtaining module configured for obtaining the short message status table from the memory system when the mobile phone is powered on;
    an updating module configured for updating the short message status table if a current status of the short messages has been changed; and
    at least one processor executing the determining module, the reading module, the writing module, the saving module, the obtaining module and the updating module.

2. The computing system according to claim 1, wherein the short message status table comprises an index column, and a status column.

3. The computing system according to claim 2, wherein the index column is configured for storing index values of the short messages.

4. The computing system according to claim 2, wherein the status column is configured for storing current statuses of the short messages.

5. The computing system according to claim 4, wherein the current statuses of the short messages comprise a blank short message, a read short message, an unread short message, a sent short message, and an unsent short message.

6. A computer-implemented method for performing quick short message functions for a mobile phone, the method comprising:
    reading short messages from a subscriber identify module (SIM) card of the mobile phone and copying the short messages read from the SIM card into a short message status table, if the mobile phone has been started up for a first time;
    reading short messages from a memory system of the mobile phone, and copying the short messages read from the memory system into the short message status table, the short message status table comprising a content column short that stores content of the short messages;
    saving the short message status table into the memory system;
    obtaining the short message status table stored in the memory system when the mobile phone is powered on;
    monitoring the mobile phone to determine if a current status of the short messages has been changed; and
    updating the short message status table, and saving the updated short message status table into the memory system, if the current status of the short messages has been changed.

7. The method according to claim 6, wherein the short message status table comprises an index column, and a status column.

8. The method according to claim 7, wherein the index column stores index values of the short messages.

9. The method according to claim 7, wherein the status column stores current statuses of the short messages.

10. The method according to claim 9, wherein the current statuses of the short messages comprise a blank short message, a read short message, an unread short message, a sent short message, and an unsent short message.

11. A non-transitory computer-readable medium having stored thereon instructions for performing quick short message functions for a mobile phone, when the instructions are executed by a mobile phone causes the mobile phone to:
    read short messages from a subscriber identify module (SIM) card of the mobile phone and copying the short messages read from the SIM card into a short message status table, if the mobile phone has been started up for a first time;
    read short messages from a memory system of the mobile phone, and copying the short messages read from the memory system into the short message status table, the short message status table comprising a content column short that stores content of the short messages;
    save the short message status table into the memory system;
    obtain the short message status table stored in the memory system when the mobile phone is powered on;
    monitor monitoring the mobile phone to determine if a current status of the short messages has been changed; and
    update the short message status table, and saving the updated short message status table into the memory system, if the current status of the short messages has been changed.

12. The medium according to claim 11, wherein the short message status table comprises an index column, a status column, and a content column.

13. The medium according to claim 12, wherein the index column stores index values of the short messages.

14. The medium according to claim 12, wherein the status column stores current statuses of the short messages.

15. The medium according to claim 14, wherein the current statuses of the short messages comprise a blank short message, a read short message, an unread short message, a sent short message, and an unsent short message.

* * * * *